March 5, 1940.    J. BIJUR    2,192,176
LUBRICATING INSTALLATION
Original Filed Jan. 18, 1923
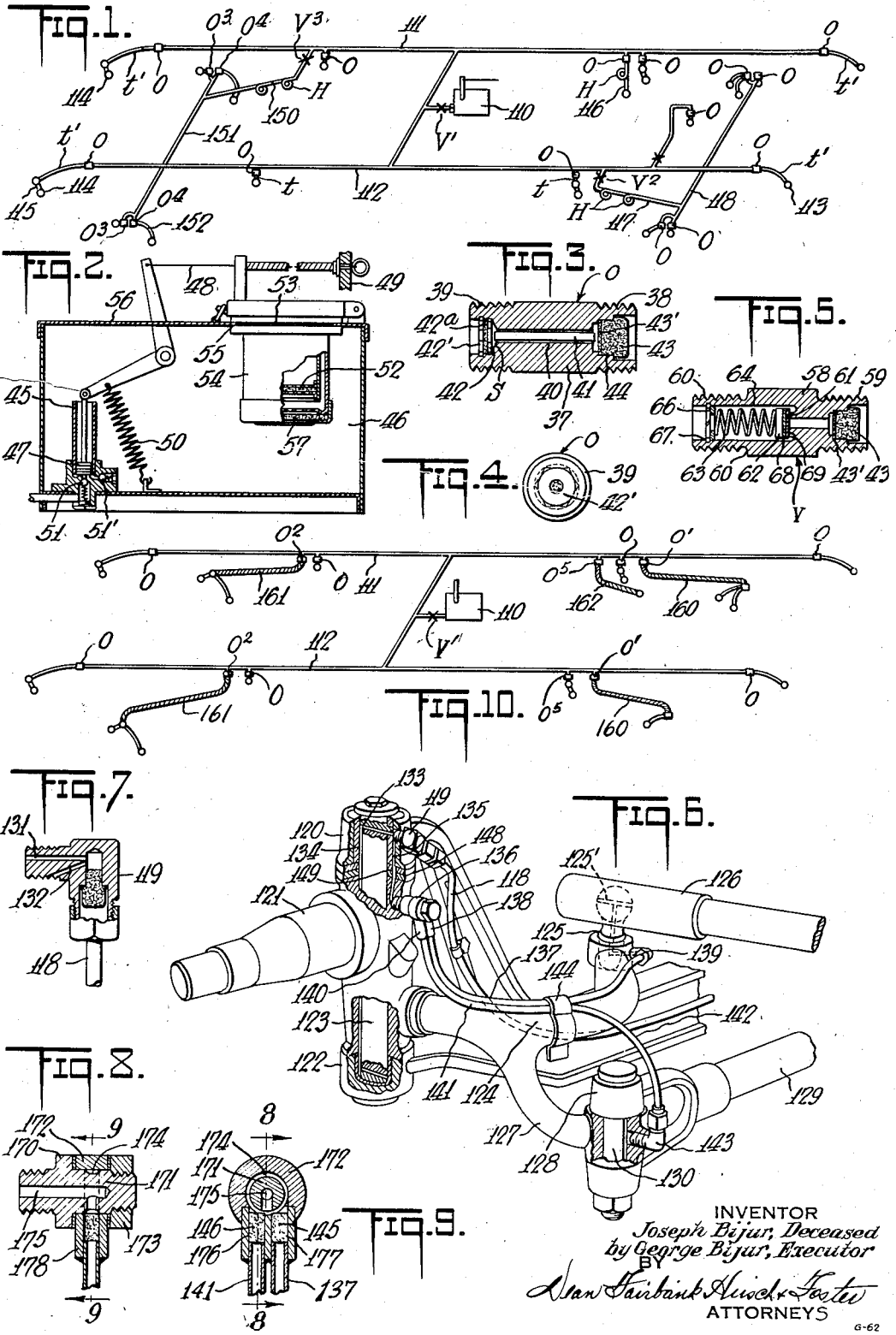
INVENTOR
Joseph Bijur, Deceased
by George Bijur, Executor
BY
ATTORNEYS Patented Mar. 5, 1940

2,192,176

UNITED STATES PATENT OFFICE 2,192,176

LUBRICATING INSTALLATION

Joseph Bijur, deceased, late of New York, N. Y., by George Bijur, executor, New York, N. Y., assignor, by mesne assignments, to Auto Research Corporation, a corporation of Delaware Original application January 18, 1923, Serial No. 613,476, now Patent No. 2,009,428, dated July 30, 1935. Divided and this application June 29, 1935, Serial No. 29,023

11 Claims. (Cl. 184—7)

The present invention relates to centralized lubricating installations, more particularly to installations for lubricating many or all of the bearings on the chassis of a motor vehicle or other machinery from a single source of control.

The invention is especially concerned with the type of installation in which the various bearings are to be supplied as required, by oil delivered thereto by pressure from a suitable source, applied to the head of a system of oil-filled conduits communicating with the bearings.

It is an object of the invention to provide an installation of the above type of simple and inexpensive construction, functioning reliably to prevent undesired drainage or loss from the piping through any one or more of the multiplicity of bearings supplied.

Among other objects of the invention are to provide a system of the type mentioned, the assembly or installation of which shall be particularly expeditious and inexpensive, and which, in operation, shall effect distribution of lubricant to the bearings reliably in accordance with requirements, and without deficiency or excessive overflow at any bearing.

Another object is to provide a lubricating installation, the use of which shall not require the exercise of any selective discretion, but in which, as the result of a simple manipulation, correct and sufficient lubrication is effected at each of the bearings, whether tight or loose and without excessive overflow.

Another object is to provide an installation of the above type which will not be deranged by the entry of dust or dirt and the operation of which will not require much effort.

Another object is to provide an installation which if injured will not be disabled beyond the vicinity of the damage, and in which repair or replacement may be effected without either draining or shutting off the line.

Clogging of any of the restricted ducts or outlets with solid particles that may be carried with the oil is prevented preferably by providing the oil reservoir with an appropriate filter, so that only clean oil is admitted therefrom to the piping, and there may also be provided small strainer elements in advance of the outlets, to intercept any dirt or chips picked up by the oil in its travel through the pipe line.

According to another feature of the invention, the otherwise open length of pressure transmitting piping is restricted or plugged near its outlets, in order to interpose, not merely a restriction, but a high resistance to the flow of lubricant, that is, a resistance of such order as to substantially prevent gravity flow, but to permit only slow, preferably, drop by drop, seepage of the oil under a sustained working or operating pressure The resistance of the outlets is so high compared to that encountered in the line, that differences in length of line to the various bearings, or in tightness or looseness of the bearings, do not seriously impair the accuracy of distribution.

In view of the consequent relatively slow rate of flow in the line during discharge, it is feasible, and preferable to use piping of extraordinarily small diameter, preferably of seamless metal tubing, to resist the comparatively high pressures incurred.

The extremely slow rate of oil flow in operation, which is a concomitant of the high resistance outlets, renders inconvenient the use of direct discharged large volume pumps as the propelling means because of the length of time for which the power source and manual effort has to be sustained.

According to this invention, a pump structure is charged against the resistance of a spring, thus, operating as a pressure generator, the spring exerting automatically a discharging pressure, sustained until the discharge is completed.

The above and other features of the invention may be more fully understood from the accompanying drawing, in which are shown various possible embodiments of the several features of the invention.

In the drawing:

Fig. 1 is a perspective diagrammatic showing of one piping diagram together with the pump, Fig. 2 is a view in longitudinal cross-section of one preferred form of a pressure source, Fig. 3 is a view in longitudinal cross-section of a restriction outlet fitting, Fig. 4 is an end view of said restriction outlet fitting, Fig. 5 is a view in longitudinal cross-section of a check valve fitting, Fig. 6 is a perspective view illustrating the lubrication of a king pin and related bearings, Fig. 7 is a detail view in longitudinal section through the multiple restriction duct fitting shown in Fig. 6, Fig. 8 is a view in longitudinal cross-section on the line 8—8 of Fig. 9 through the multiple outlet fitting shown in Fig. 6, Fig. 9 is a sectional view taken on the line 9—9 of Fig. 8, and Fig. 10 is a piping diagram of a modification.

In Fig. 1 there is shown a system particularly adapted for lubricating an automobile chassis having three lines, a chassis frame line, a front axle line and a rear axle line, which are shut off by valves from communication with each other, except when pressure is applied at the source.

Each line is open from end to end and has ducts therein restricted to offer a resistance to flow, which is high relative to that in the length of the line, thereby effecting reliable distribution. The restriction ducts on each line are at a common level to prevent drainage or syphoning of oil. Some of the restriction ducts are disposed as terminal or outlet fittings on the bearings at highest level on any line, and the remaining restriction ducts on the line are connected by corresponding conduits open for gravity feed to the lower bearings.

The specific installation of Fig. 1 comprises a pressure generator 110, shown in detail in Fig. 2, connected to mains 111 and 112 extending lengthwise of the vehicle frame.

The chassis frame is illustratively shown curved downward at the front and rear, so that the front bolts 113 for the front springs and the rear shackles 114 for the rear springs are at a level lower than that of the main.

Each of the spring bolts and shackles may be supplied through a restricted duct element O as shown in Fig. 3, said duct elements desirably being all at substantially a common level, which in the preferred form is the level of the mains 111 and 112.

Short taps $t$ to the various bearings, serve as gravity flow leads for the lubricant forced past the restriction ducts, the drooping ends $t'$ of the mains, conveying lubricant by gravity flow to the bearings at their ends, after it has been forced through the corresponding restriction ducts O at the uniform level of the main.

The spring shackles are preferably provided with appropriate conduits 115 through which lubricant passes by gravity from the upper to the lower bearing thereof, both bearings of each shackle being supplied from a single corresponding restriction fitting. The detailed mechanical construction and connection of the shackle, need not here be described, as it is no part of the present invention.

In the present embodiment, also a flexible conduit 116 is tapped from the main to supply the rear bearing on the drag link of the steering gear, a restriction fitting O being also provided near the head of said conduit and at substantially the same level as the other ducts O on the main to control the flow through conduit 116.

A valve V′ normally closes the head of the line from the pressure generator and from atmosphere, so that the line will remain filled up to all of the equi-level chassis frame restriction ducts. The various branches or taps $t$, $t'$ beyond the restriction ducts which serve to connect the latter with the bearings, are normally empty or drained.

In the present embodiment, a flexible conduit 117 is provided, tapping the main 112 and leading to the front axle. This line is preferably of solid metal seamless air-tight or fluid-tight piping provided with one or more appropriate helical conformations H to permit of the relative movement of axle and frame.

The branch 117 includes a transverse element 118, also of solid pipe upon the front axle, from which the various bearings at opposite ends of the axle are supplied. A valve $V^2$ of the type shown in Fig. 5 is provided at the head of branch 117 to interrupt the otherwise open or vented connection between the open restriction ducts O at the chassis frame level and the outlets therebelow at the front axle.

A preferred embodiment of the distributing means for supplying the bearings at the left end of the front axle, is shown only diagrammatically in Fig. 1, the structure being illustrated in detail in Figs. 6 to 9 to be subsequently described.

The outlet fittings are indicated at O by symbol □ at each of the bearings to be lubricated and are best shown in Figs. 3 and 4.

The outlet fittings O may be of identical construction.

In the preferred embodiment, the unit comprises a pipe fitting element 37 threaded at one end 38 for connection to the conduit and at the other end 39 for attachment either to the bearing, in the manner of an oil cup or in the run of the line.

Within the bore 40 of the fitting is a rod or pin 41 which is of substantially the same cross-sectional area as said bore to substantially fill the same, the difference in diameter being in the order of .001 of one inch.

A spring washer 42′ is snapped into an appropriate groove in the outlet end of the fitting to prevent escape of the pin therefrom. Preferably washer 42 is pressed against a conical seat S in the fitting and affords but minute outlets at its scalloped periphery for a purpose appearing below.

A plug 43 of material, such as felt, is snugly fitted into a corresponding socket 44 at the inlet end of the fitting, exposing to the flow of oil from the line, both its end and a portion of its lateral surface, for the purpose of intercepting any minute particles or chips taken up in the line, thereby preventing eventual clogging of the minute crevice between the bore of the fitting and the pin therein.

Preferably a backing 43′ of metal gauze is disposed at the inner end of the felt plug to prevent movement toward the restriction pin 41, of any hair that may separate from the felt. The minute cross-section of the restriction being the difference between that of the bore and that of the pin, it can be easily made within close limits of accuracy, to assure reliable functioning, and by reason of the substantial length of said crevice, transversely of the pipe bore, it is unlikely to become clogged.

If desired, a disk of felt 42ª may be provided at the outlets of fittings O preferably interposed between washers 42 and 42′ to prevent the entry of dirt thereto from the bearings.

The outlet fittings have resistance of such order that when a pressure as high as fifty pounds per square inch is applied at the pressure source 110, the lubricant will escape through the outlets by seepage and not by flow, that is, at a rate in the order of only from about one to thirty drops a minute, depending on viscosity.

With such arrangement, the operation is too slow for convenient discharge by direct power discharge operation. For this reason, it is accordingly preferred to provide the device shown in Fig. 2, which includes a cylinder 45, submerged in reservoir 46 and charged by hand elevation of piston 47, as through a wire 48 accessible at a convenient position 49, and against the resistance of a spring 50 and consequently discharged by the slow return of the deformed spring which will, therefore, exert a substantial and sustained pressure, which will endure until a volume of lubricant equal to that in the cylinder, will have passed beyond the restriction outlets O to the various bearings. Check valve 51' prevents discharge of the generator into the reservoir and check valve 51 at the bottom of the cylinder maintains the outlet of the pump closed after the piston reaches discharged position.

The reservoir 46 is provided with a removable strainer cup 52 at its filling opening 53, below which is a filter cup 54 soldered as at 55 onto cover 56 of the reservoir, and provided with a bottom 57 of filter material, such as felt, to intercept solid particles in the oil, so that the advance strainers 43 at the outlet fittings will not be prematurely clogged, said strainers intercepting merely such particles or chips as are picked up in the line.

The preferred embodiment of the valves $V^1$, $V^2$ and $V^3$ is shown in Fig. 5.

The valve here shown comprises a pipe fitting 58 having threaded ends 59 and 60, which may be secured between sections of the pipe line in any appropriate manner.

The fitting is provided with an integral annular valve seat 61, preferably highly burnished, and a disk valve 62 is urged to closing position against said seat by a coil spring 63, within the bore 64 of the fitting, said coil spring being maintained in place by a washer 66 in turn held by a split ring 67.

The valve is preferably formed of metal and has a seating portion 68 which may be of soft leather faced with oil paper or silk 69 or the like.

The valve fitting is also provided with a felt strainer 43 similar to that shown in the fitting of Figs. 3 and 4 to prevent the passage of chips from the line to the valve seat which might interfere with seating.

Referring to Fig. 6, the branch line 118 is connected through a fitting 119 to be described below, in the upper clevis arm 120 of the front axle.

The wheel control apparatus is shown of conventional construction, including a steering knuckle 121 fitting between arms 120 and 122 of the axle clevis and connected thereto by king pin 123 which in the present embodiment is shown of the rotatable type to move as a unit with the steering knuckle.

Rigid with the steering knuckle 121 is shown the curved steering arm 124 provided with the ball stud 125, coacting with the usual socket in the drag link 126. As an integral branch of the steering arm, there is a further arm 127 having its end connected to the clevis 128 of the tie rod 129 by means of a bolt 130.

The fitting 119 shown in section in Fig. 7 is of a type generally similar to that shown in Fig. 3 except that it is provided with two restriction pin ducts 131 and 132, through the former of which the bearings of the associated king pin are supplied, the other supplying the drag link and tie rod bearings.

Restriction duct 131 communicates directly with the upper bearing 133 of the king pin, overflowing through a vertical passage 134, at the side of the king pin, to supply the lower bearing 122 thereof.

The second restriction duct 132 communicates with a vertical passage 135 through the upper clevice arm 120 of the axle and the steering knuckle 121, and empties at a branch or double outlet fitting 136 (Figs. 8 and 9). The double outlet fitting includes an outlet plug 170 threaded into the steering knuckle and provided with an integral axial stud 171 about which is telescoped collar 172, held firmly in position thereon by nut 173. The stud has an outer peripheral groove 174 communicating with the bore 175 of the outlet plug, said peripheral groove communicating with lateral outlets or branches 176 and 177 in an integral lug 178 on collar 172.

A conduit 137 is connected as by soldering to the outlet of branch 177 of the double outlet fitting and extends down to the steering arm 124 and along said arm and is connected by an appropriate unrestricted outlet fitting 139 to the ball bearing element 125. To the second branch 176 of the double outlet fitting is similarly connected a conduit 141 similar to that described, which extends parallel thereto, along the arm 124 and bridges over as shown at 142 to supply the tie rod clevis pin 130 through an unrestricted outlet fitting 143 at the end thereof.

In the present embodiment it will be seen, that fittings 136, 139 and 143 move as a rigid unit with the steering knuckle, so that the connecting pipes 137 and 141 may be and preferably are of solid rigid metal pipe. A single appropriate clip 144 serves for attachment of both conduits 137 and 141 to arm 124. To assure division of the lubricant in desired proportions to conduits 137 and 141, the branch or double outlet fitting 136 may be provided with wicks 145 and 146 in the branches thereof and resting upon the upper ends of the conduits.

In operation, lubricant forced by pressure past the second restriction duct 132 in fitting 119, drops by gravity through passage 135 and is divided at the wicks 145 and 146 in the double outlet fitting, part dripping into conduit 141 and draining to bearing 130, the rest dripping into conduit 137 which delivers through fitting 139 to and through ball 125, the latter being at a level several inches lower than the wick.

It is understood that the length of the conduit 137 will normally be filled with lubricant up to substantially the level of the ball duct 125', so that upon entry of lubricant through wick 145, the level at the opposite end of the line will rise to admit a corresponding quantity of oil to the bearing. The oil normally remaining in conduit 137 will not leak therefrom, since said conduit, as previously noted, is of rigid pipe.

As the pressure from the source is substantially absorbed in the restriction fitting 119, oil passes by gravity flow through passages 134 and 135, from the bearing 120, to the relatively movable steering knuckle. The thrust bearing 148 between axle and steering knuckle being maintained relatively tight by the weight of the vehicle body supported thereon and the oil which passes thereacross to the bearings not being under pressure, leakage is substantially precluded.

As shown, passage 135 is preferably spaced from the king pin, the communicating aperture 149 in the thrust washer being of sufficient width to maintain continuity of said passage in all positions of the steering knuckle. Only a small film of the oil can escape laterally at the thrust washer and serves to lubricate the thrust bearing. Thus, the oil is delivered from the axle to the relatively movable bearings on the steering knuckle, by passing across the particularly rugged thrust bearings of the vehicle, thereby eliminating the need for projecting oil swivels or extra length of flexible conduits, which unless adequately protected, are subject to injury from the impact which the front of the vehicle frequently encounters.

Of course, it will be understood that for lubricating the bearings at the right side of the front axle, the construction described would be used, simplified by the omission of conduit 137, the restriction duct 132 supplying only the tie rod clevis pin bearing.

Instead of the single multiple fitting 119 with two restriction ducts, it is of course, understood that separate and distinct fittings may be used, and it is, moreover, apparent that, if desired, the drag link and the tie rod bearings may each be supplied through a separate and distinct restriction duct, as may the upper and the lower king pin bearings.

It is manifest that the invention illustrated in Fig. 6 is applicable to a stationary instead of the rotary king pin construction shown, and also to a construction of tie rod pin rigid with the steering knuckle instead of with the tie rod or to other types of bearings on other types of mechanisms than chassis.

If desired, a valve of the type shown in Fig. 5 may be provided at the multiple restriction fitting 119, and may be embodied in a unitary construction therewith.

As best indicated in the drawing in Fig. 1, the outlet ends of the restriction pin ducts 131 and 132 at the front axle, which are disposed two at each king pin, are all at a common level. The valve $V^2$ preventing the entry of air to the pipe line 117 from above said ducts, and said branch pipe being air-tight, from said valve to the ducts, it follows that said branches will normally be maintained filled with lubricant without likelihood of any leak, drainage or syphoning therefrom, even though no valves are provided at or below the restriction ducts.

A single pipe line 150 generally similar to that at the front axle, provided with similar helical conformations H and normally closed at its upper end with respect to the chassis frame main by a valve $V^3$ which may be of the type shown in Fig. 5, supplies the rear axle through transverse pipe 151.

Pipe 151 delivers oil through an arrangement of restriction ducts O at a common level, indicated diagrammatically in Fig. 1. Illustratively, four restrictions are shown, two at each side, two of said restrictions $O^3$ constituting terminals applied at the rear wheel bearings, the other two restrictions $O^4$ emptying by gravity through corresponding conduits 152 to supply the rear brakes.

In the installation shown in Fig. 1, where the restriction ducts on each of the lines are at a common level, and each line is closed thereabove against entry of air, no escape of oil will occur, except while the pressure generator is functioning to effect slow seepage past the restriction ducts, all of the lines remaining filled from the source up to said ducts, and delivering to those conduits connecting restriction ducts to bearings.

If the application of working pressure to the system resulted in a continuous stream of sufficient volume to fill the normally empty conduits to the lower bearings instead of in the slow drip set forth, it is apparent that after shutting off the source of pressure, such filled conduit might drain oil from a portion of the line as by a syphoning action, air entering near a bearing or bearings at higher level.

Obviously the pressure generator and associated valve arrangement shown in the copending application Serial No. 580,668 filed August 9, 1922, Patent No. 1,975,920, may be substituted for that diagrammatically shown in Figs. 1 and 2.

In Fig. 10 is shown a diagrammatic view of another embodiment of the invention, in which all of the restriction ducts governing the distribution of the charge from the pressure generator are at substantially one common level, the lines being normally empty below said level. This view indicates a pressure generator 110 normally closed as by valve $V'$ from pipe mains 111 and 112, identical with those in Fig. 1.

As indicated, the restriction ducts O to the various shackle links and springs bolts are at a common level, as in Fig. 1. Main 111 supplies all of the bearings at the left side of the vehicle and main 112 all of the bearings at the right side. A flexible conduit 160 at the left main has a restriction duct $O'$, at substantially the same level as ducts O, and leads to the left king pin.

The division of lubricant to the king pin and related bearings is effected through means similar to that shown in Fig. 6, except that instead of the restrictions in fitting 119, wicks (not shown) may be used to divide the lubricant which flows thereto by gravity from restriction duct $O'$. A similar flexible line 161 supplies the bearings at the left side of the rear axle, division there also being effected by wicks (not shown), said line also having a restriction duct $O^2$ at its head, at substantially the same level as the remaining ducts. A similar flexible connection 162 is effected through a restricted duct $O^5$, at the same common level with the rear end of the steering gear.

The arrangement at the right side of the vehicle is identical with that at the left except, of course, that no steering gear lubrication is provided.

In operation, the discharge of the pressure generator will cause lubricant to be forced past the various restriction ducts at the common level and to drain by gravity through the various taps and flexible branches and to supply the corresponding bearings. When the system is not operating, the valve $V'$ of Fig. 1 or 51 of Fig. 2 closes the system against entry of air from above, and the various restriction ducts being at one common level, no drainage or escape can take place from the mains.

The tap and flexible lines below the outlets in this embodiment being normally empty, may, if desired, be made of hose which need not be air-tight or pressure-tight. Thus, in the present embodiment, the various bearings on the chassis frame and below the chassis frame are reliably lubricated, without the use of any valves, other than the single valve controlling the exit from the pressure generator.

It will be understood that while the various layouts of piping set forth have been shown illustratively applied to the bearings of a vehicle of one type of construction, the bearings on any automobile chassis or any other machinery may be lubricated through piping connected in the general manner disclosed. In the use of a piping layout of the general type as shown, the selection of bearings on each of the separate lines and the number of such lines will depend in each case on the relative position of such bearings.

It is to be noted that all the bearings at any substantially common level need not necessarily be supplied from a common system of piping, there being wide freedom of choice in the arrangement of conduits and restriction ducts with respect to any vehicle.

The invention is not limited in its application to automobile chassis lubrication, but many of the features thereof, may be applied to the lubrication of substantially any machine or system or plurality of machines.

The present application is similar in subject matter to the parent application Serial No. 613,476, filed January 18, 1923, which issued as Patent No. 2,009,428, on July 30, 1935, and constitutes a division thereof. Figs. 1 to 10 correspond respectively to Figs. 10, 3, 4, 4a, 5, 11, 11a, 11b, 11c and 12 of said parent application. It is to be understood of course that in lieu of the outlet fittings specifically shown in Fig. 3, other outlet fittings such as shown in application Serial No. 580,668, filed August 9, 1922, now Patent No. 1,975,920, may also be used.

The installation may be fed from other types of pumps than those specifically shown, such for example as are disclosed in Serial No. 468,790 filed July 18, 1930; Serial No. 523,668 filed March 19, 1931; and Serial No. 352,744 filed April 5, 1929, respectively Patents 2,145,854, 1,998,438 and 2,081,907.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

What is claimed is:

1. Lubricating means for the bearings at the front axle of a motor vehicle, comprising a centralized source of lubricant pressure on the chassis frame, piping connecting said source with said front axle, said piping including a flexible portion to permit of the relative movement of said axle and frame, said flexible portion having an inlet check valve, highly restricted ducts fed from said flexible portion located near the upper ends of the king pins and rigid with said axle and delivering lubricant to said king pins, other less restricted ducts receiving lubricant from one of said first ducts, and a conduit connecting each of said latter ducts with a bearing below said king pins.

2. In combination, a chassis frame, a distributing conduit system on said frame, a valved flexible lead extending from said system, an axle, a steering knuckle, a king pin connecting said axle and said steering knuckle, rigid with one of said parts and having a bearing in the other, and an arm integral with said steering knuckle hving a tie rod bearing at its end, lubricant supply fitting means rigid with respect to said axle supplied from said lead, having one outlet for supplying lubricant to said king pin bearing, a second outlet in parallel therewith for supplying said tie rod bearing, and conduit means connecting said second outlet to said tie rod bearing.

3. In combination, a chassis frame, a distributing conduit system on said frame, a valved flexible lead extending from said system, a front axle for a motor vehicle, a steering knuckle, a king pin connecting said axle and said knuckle and having a bearing with respect to one of said elements, an arm rigid with said steering knuckle and having a tie rod bearing at its end, a fitting applied at said axle supplied from said lead, and having a first highly restricted duct communicating with a passage to supply said king pin, said fitting having a second highly restricted duct communicating with a passage longitudinally of said steering knuckle and extending along said arm to said tie rod.

4. In a lubricating installation, in combination, a chassis frame, a distributing conduit system on said frame, a valved flexible lead extending from said system, a front axle, a steering knuckle, a king pin connecting said axle and said knuckle, arms rigid with said steering knuckle to the drag link and to the tie rod, lubricant supply fitting means supplied from said lead, connected to said axle adjacent said king pin, said fitting means having a highly restricted passage communicating with conduits for lubricating said king pin, a second highly restricted passage in said fitting means extending downward through said steering knuckle, two branch conduits supplied therefrom and extending along said arms to said drag link bearing and to said tie rod bearing, and wick dividing means for sub-dividing the oil delivered from said second outlet to said branch conduits in the proportions required.

5. A centralized lubricating installation for a mechanism having a unitary rigid frame with a plurality of spaced and distributed bearings at an approximately common level, said bearings requiring relatively small, yet accurately proportioned quantities of lubricant, said installation comprising a central pump, a distributing piping system having a plurality of interconnected horizontal mains and outlet connections depending from said mains toward said bearings, and a plurality of flow proportioning fittings of such high obstructing effect as to prevent substantial gravity flow, to predominantly control distribution of lubricant and yet permit sufficient flow under applied pressure from said pump to feed said bearings, said fittings having a tremendously greater obstructing effect than the system and the bearings, to said connections, the junctions of said mains and connections being at a common level above the level of the bearings, said fittings being positioned at and in said junctions.

6. The installation of claim 5, said mechanism having connected structures including groups of bearings, relatively movable with respect to the mechanism, the connections to said bearings being flexible and check valves being provided on said connections adjacent said mains.

7. A centralized lubricating installation for a mechanism of the type having distributed and spaced bearings positioned in groups at different levels, a source of lubricant pressure positioned adjacent one of said groups, piping systems having downwardly extending outlet connections, feeding each group of bearings, one connection being provided for each bearing, one of said systems being fed directly from said source and the other system being fed by a connection from said first system and a valve on said connection to prevent return flow from said second system to said first system, each connection at its junction with said piping being provided with a high restriction flow metering fitting feeding only under substantial applied pressure from said source and substantially preventing gravity feed, said fittings proportioning the lubricant among the bearings of each group.

8. The installation of claim 7, said valve being a spring seated valve being opened only by substantial pressure application from said source.

9. The installation of claim 7, said groups being movable in respect to each other and said connection being flexible.

10. A centralized lubricating installation for a mechanism having a plurality of bearings at different levels, a source of lubricant pressure, a distributing piping system with a plurality of outlets fed from said source, said outlets being at a common level substantially above said bearings and including high obstruction metering fittings preventing substantial gravity flow, while permitting flow under applied pressure from said source, and tail pipe connections from said fittings to said bearings permitted flow of lubricant by gravity from said fittings to said bearings.

11. A centralized lubricating installation for a mechanism having a plurality of spaced and distributed bearings at varying levels to receive minute, yet accurately proportioned quantities of lubricant; said installation including a central pressure pump, a plurality of connected tubing mains into and through which lubricant is forced under substantial undiminished pump pressure by said pump, a valved connection between said mains and said pump, a plurality of flow restricting fittings one for each bearing positioned substantially above the respective bearings and having an obstructing effect tremendously greater than that encountered in the tubing or bearings so as to predominantly control the proportionment of the pump discharge among the bearings and to absorb substantially all of the pressure of said pump discharge and to prevent substantial gravity flow and only permit slow seepage under substantial applied pump pressure, said fittings being positioned at the ends of said mains, and a plurality of gravity flow tail pipes of substantial length leading from said fittings to said bearings, said fittings serving as the sole connections between said mains and tail pipes.

GEORGE BIJUR,
*Executor of the Estate of Joseph Bijur, deceased.*